No. 769,061. Patented August 30, 1904.

UNITED STATES PATENT OFFICE.

JOHANN DAVID, OF BARMEN, GERMANY, ASSIGNOR TO OTTO BREDT & CO., OF BARMEN, GERMANY, A FIRM.

PROCESS OF MAKING SOLUBLE STARCH.

SPECIFICATION forming part of Letters Patent No. 769,061, dated August 30, 1904.

Application filed October 27, 1903. Serial No. 178,778. (No specimens.)

*To all whom it may concern:*

Be it known that I, JOHANN DAVID, a resident of the city of Barmen, Province of Rhenish Prussia, Kingdom of Prussia, in the Empire of Germany, have invented new and useful Improvements in the Preparation of Soluble Starch, of which the following is a clear and full specification.

My invention has for its object the manufacture of soluble starch which, by reason of its peculiar properties, is adapted to form, in conjunction with water, a clear and adhesive solution of good permanency and which may be used in place not only of dextrin, but also as a substitute for gelatin, glue, gum, and the like.

The essential feature of the invention consists in subjecting starch of any suitable kind—such as potato-starch, wheat-starch, maize-starch, and the like, or starch-containing materials—to the action of an excess of permanganate salt—that is to say, more permanganate is employed than is necessary for oxidizing the impurities accompanying the starch. The permanganate may be employed in a neutral, alkaline, or sulfuric-acid solution.

The following results have been observed of the action of permanganate on starch: If starch be treated with an excess of a watery or alkaline solution of permanganate, after a certain time it is converted into a soluble form. The temperature selected may range between the ordinary one and one approximate to the temperature limit at which starch becomes pasty—on an average 50° centigrade. In course of the process superoxid of manganese is precipitated, which after the completion of the reaction is dissolved in the ordinary way by means of acids with the addition of a reducing agent—such, for instance, as bisulfite, oxalic acid, formaldehyde, and the like. The process may also be modified by adding sulfuric acid at the commencement of the reaction to the starchy mass, thus avoiding the precipitation of the superoxid of manganese.

Example I: One hundred kilograms of starchy material—potato-flour, for instance—is treated in a lead-lined wooden vat with one hundred and thirty kilograms of a two-per-cent. solution of permanganate of potash and the sludge allowed to remain, with frequent stirrings, for about twelve hours. The temperature is preferably kept at 45° centigrade. A precipitate of superoxid of manganese is gradually formed, which precipitate after the completion of the reaction is removed by acidulating the sludge with sulfuric acid and decoloring with bisulfite solution. The starch is then freed from the acid and the manganese salts by washing with water and dried at a low temperature. By using larger quantities of permanganate of potash—say, for instance, one hundred and thirty kilograms of a three-per-cent. solution—the reaction is ended in a shorter time, while if less permanganate be used—say one hundred and thirty kilograms of a one-per-cent. solution—the decomposition proceeds more slowly and incompletely.

Example II: One hundred kilograms of starchy material—for instance, potato-flour—are made into a sludge with one hundred and thirty kilograms of a caustic-soda solution of 0.8 per cent. NaOH at a temperature of about 30° centigrade. Then thirty-five kilograms of an eight-per-cent. solution of permanganate of potash is added to the sludge. After twelve hours, during which time the sludge may be repeatedly thoroughly stirred, the reaction is completed. The further proceedings are the same as were described in connection with Example I.

Example III: One hundred kilograms of a starchy material—for instance, potato-flour—are made into a sludge with one hundred and thirty kilograms sulfuric acid of fifteen per cent. $SO_4H_2$, preferably at a temperature of 32° centigrade. Twenty-five kilograms of an eight-per-cent. permanganate-of-potash solution are then added to the acid-starch sludge. The sludge, which is at first reddish brown, becomes perfectly white after two hours, when the reaction is ended. The starch is freed from the acid and the manganese salts by washing with water and dried at a low temperature.

The conditions stated in the foregoing Examples I, II, and III also apply to other kinds of starch. Other permanganates may also, of course, be employed instead of permanganate of potash—such, for instance, as permanganate of soda or permanganate of calcium in equivalent quantities.

The soluble starch made in this manner is dyed deep blue in a watery solution of iodin tincture without forming a deposit of insoluble iodin starch. The soluble starch is free from dextrin and saccharine substances, has a neutral reaction, and is non-hygroscopic. Its solution easily permeates textile fibers and after drying produces a very elastic and shiny finish, which does not disappear in damp air, as is well known in cases where dextrin is used.

This improved process has the great advantage over the many known processes for making soluble starch which are based on quite other principles, that the solution of the product obtained is much more permanent than other soluble-starch solutions and remains liquid even after standing for several days and hardly ever becomes flocculent. This is of very special importance, because the solutions can be used up to the last drops. They also do not set or harden in the sizing-trough, and the cold solutions may with advantage be employed for cold-sizing by reason of their fluidity.

Having now particularly described and ascertained the nature of the said invention and in what manner the same is to be performed, I declare that what I claim is—

1. A process for making soluble starch from starchy substances of all kinds, consisting in subjecting the same to the action of an excess of permanganate, i. e., of more permanganate than is required for oxidizing the impurities in the starch, coloring-matter and the like, at a temperature ranging between the ordinary one and one at which starch becomes pasty (about 50° centigrade) until all the starch is converted into the soluble modification, substantially as described.

2. A process for making soluble starch from starchy substances of all kinds, consisting in subjecting the same to the action of at least one and one-half per cent. of permanganate at a temperature ranging between the ordinary one and one at which starch becomes pasty (about 50° centigrade) until all the starch is converted into the soluble modification, substantially as described.

In witness whereof I have hereunto set my hand in presence of two witnesses.

JOHANN DAVID.

Witnesses:
ALBERT JÜTTE,
EMIL BARTENSTEIN.